Patented Feb. 5, 1935

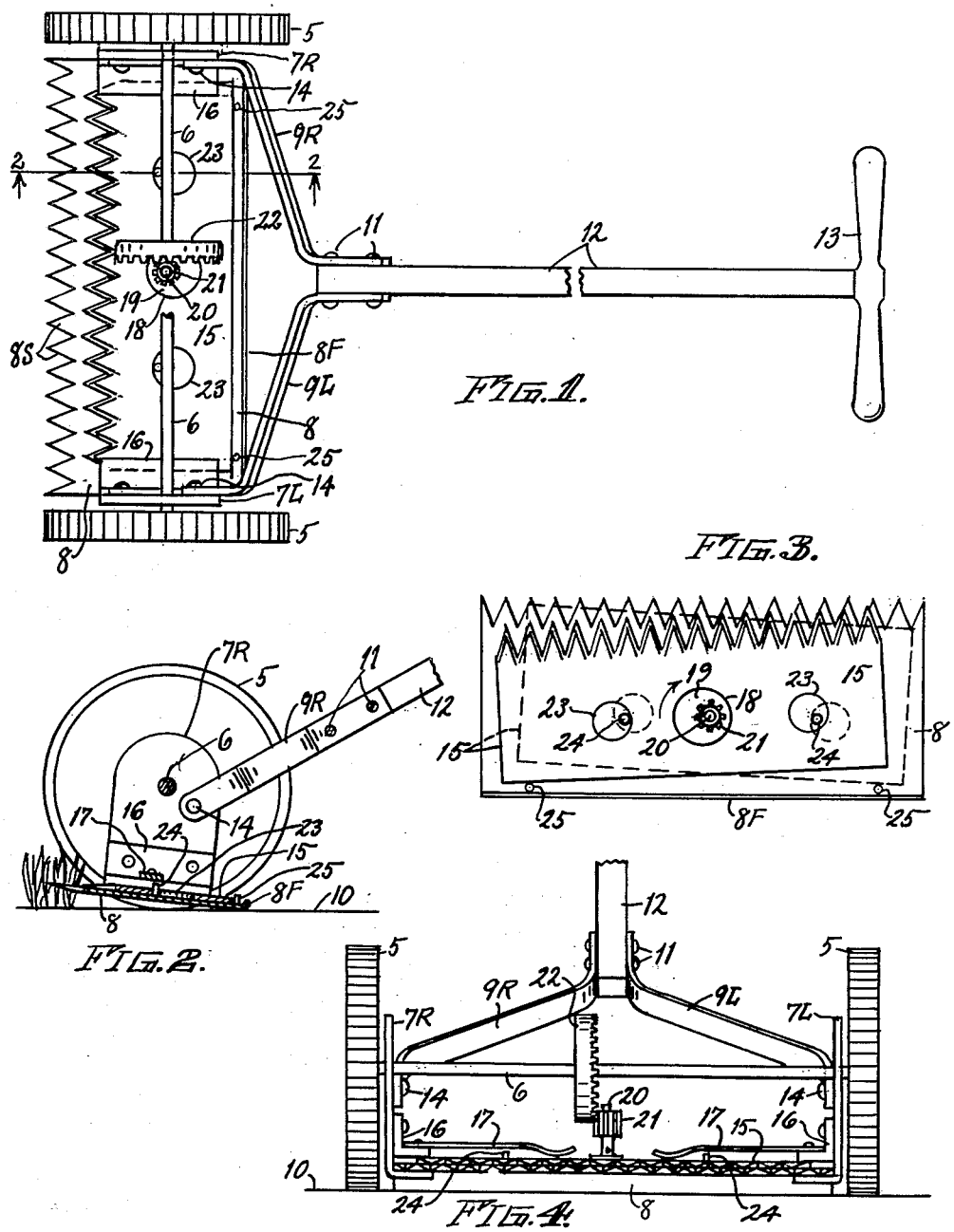

1,989,821

UNITED STATES PATENT OFFICE 1,989,821

LAWN MOWER

Edward W. Peterson, St. Paul, Minn.

Application April 2, 1934, Serial No. 718,627

4 Claims. (Cl. 56—246)

This invention relates to improvements in lawn mowers of the type having a stationary and a reciprocable blade, both serrated at their forwardly directed edges.

The main object is to provide a device embodying construction which produces a particularly efficient cutting action and involving the slashing action of the reciprocable blade, as hereinafter fully set forth, reference being had to the accompanying drawing, in which—

Fig. 1 is a top view of a lawn mower embodying my improvements, a portion of the drive shaft being omitted to clearly reveal the eccentric cam parts.

Fig. 2 is a sectional elevation as on line 2—2 in Fig. 1.

Fig. 3 is a plan view of the serrated cutter blade members showing the upper cutter blade in extreme left position in full lines, and in extreme right position in dotted outline.

Fig. 4 is a front elevation of Fig. 1.

Referring to the drawing by reference numerals, 5 designates the usual pair of ground wheels having a common axle or drive shaft 6. 7R and 7L are respectively, a right and left L-shaped frame plate one just inward of each ground wheel mounted on the drive shaft each with its lower horizontal flange directed inwardly and to both of which flanges is fixed the end parts of an elongated stationary cutter blade 8 serrated forwardly (as 8S) at a suitable elevation over the ground on which the wheels travel. The blade 8 is normally inclined forwardly and upwardly, its rear edge or rim part being adapted to ride on the ground and said rear edge part preferably rounded upwardly as at 8F (see Figs. 1, 2 and 3) to permit free reverse or rearward movement of the mower. Obviously the width of the blade 8 and its angular position for cutting determines the height of the cutting edge above the ground 10.

9R and 9L are, respectively, the right and left handle yoke members, the rear ends of which are suitably affixed as at 11 to the forward end part of the push bar 12 having at its rear end the usual transverse T-handle or hand hold 13. The forward ends of the yoke members are fixed, pivotally each to a pin 14 or equivalent, in the upright part of the frame members 7R—7L, each pin located rearward of and below the drive shaft 6 (see Figs. 2 and 4). With the yoke thus pivotally connected it is obvious that when the mower is pushed forwardly, with the push bar in the usual angular position, downward and forward pressure is exerted on pins 14 causing the cutter blade 8 to bear downward with its rear part and simultaneously retaining the forward cutting edge at a predetermined elevation while cutting is in progress.

15 is the upper cutter blade of elongated quadrangular form, having a forward serrated edge, the said blade reciprocated on the stationary blade 8 and its opposite ends are guided and maintained between said latter blade and a pair of angle-iron guards 16 or equivalent fixed one to each frame end member 7R or 7L. 17 are a pair of yieldable, spring metal, pressure bars each fixed to a guard 16 and projecting inwardly over the blade 15 and contacting with it, to hold down the central part of the blade 15 (see Figs. 2 and 4).

18 is a preferably circular, central aperture in blade 15 and in which is rotatably pocketed a correspondingly shaped eccentric cam 19 rotatable on an upright pin 20 suitably fixed in the lower cutter 8, said cam having an integral pinion 21 in constant mesh with a drive gear 22 fixed on the main drive shaft 6 intermediate the ground wheels.

The drive shaft 6 is rotated by the turning of the ground wheels, preferably by the internal gear means of the ground wheels well known in mower construction and in which the said means compensate for unequal movement of the ground wheels, rotation of shaft 6 being affected by either or both of the ground wheels according to the direction of movement of the mower.

The central position of cam 19 is important. Rotation of this cam causes a direct forward and rearward oscillation of the upper cutter blade and overlapping of the rows of teeth comprising the forward serrated edges of both blades. To the right and left of the cam, however, the blade 15 is caused by said just described oscillation to sway forward and rearwardly as the cam rotates, the said swaying as from extreme left position (in full lines in Fig. 3) to extreme right position (shown in broken outline) in Fig. 3. This provides for a slashing cutting action of the two blades and which is extremely efficient for grass cutting.

The slashing action (or throw) of the upper blade may be restricted by providing the blade with a pair of round apertures 23, one to the right and one to the left of the cam, and providing further a pair of studs 24 in the lower cutter blade and each stud projecting upwardly through one of said apertures. As an alternative to the latter a pair of studs 25 may be fixed in the rear part of the lower cutter blade to limit rearward throw of the opposite rear edge parts of the blade 15 (see Figs. 1 and 3 particularly).

The operation of my mower has been fully revealed in the foregoing description. It will be understood that the guides 16 are of such size that they guide and cover the end parts of the upper cutter blade at all times. Modifications within the scope of the accompanying claims may be embodied in the construction without departing from the scope and spirit of the invention.

I claim:

1. In a lawn mower having a pair of ground wheels, a drive shaft suitably connecting said wheels and rotated by the latter, a fixed cutter blade between said wheels and under the drive shaft and having a toothed forward edge, a secondary reciprocable cutter blade also with a row of forwardly directed teeth; said latter blade laying on the fixed blade, means operatively connecting said drive shaft with said secondary blade to impart reciprocable movement of the latter and cause the teeth of the latter to be manipulated forwardly and sidewise simultaneously into and out of cutting and slashing action with the teeth of the fixed blade, and means adjacent the opposite ends of both blades to provide a limited free swinging motion of the upper blade.

2. In a lawn mower having a pair of ground wheels, a drive shaft suitably connecting said wheels and rotated by the latter, a fixed cutter blade between said wheels and under the drive shaft and having a toothed forward edge, a secondary reciprocable cutter blade also with a row of forwardly directed teeth; said latter blade laying on the fixed blade, means operatively connecting said drive shaft with said secondary blade to impart reciprocating movement to the latter and cause the teeth of the latter to be manipulated forwardly and sidewise simultaneously into and out of cutting and slashing action with the teeth of the fixed blade, and means adjacent the opposite ends of both blades to provide a limited free swinging action of the upper blade, said reciprocating means comprising a gear on the drive shaft, a fixed upright stud on the main blade, a pinion on said stud meshing with said gear, an eccentric cam carried by said pinion, a cam bearing on the secondary blade and all said means located preferably centrally between the ground wheels of the mower.

3. The structure specified in claim 1, in which said latter means comprise a pair of fixed upright studs in the main cutter blade, one near each end thereof, said secondary blade being provided with a pair of apertures one near each end of it and located to each encircle one of said studs, as shown and described.

4. In a lawn mower having a pair of supporting wheels and a drive shaft connecting same and rotated thereby; a fixed cutter blade with a row of cutting teeth in its forward edge, said blade held in pivotally suspended position from said shaft, a secondary reciprocable blade resting on the first described blade and provided also with a row of teeth in its forward edge, an eccentric cam pocketed in the central portion of the secondary blade and an upright shaft therefor, means on the drive shaft to actuate said cam to manipulate the toothed edge of the secondary blade into simultaneous co-acting slashing and cutting action with the teeth of the main blade, and means intermediate the cam and each of the ends of the cutter blades and comprising a fixed upright pin in one cutter blade projecting into an aperture provided in the other cutter blade to permit a limited free swinging transverse action of the opposite parts of the secondary cutter blade and concentric of the cam, for the purpose set forth.

EDWARD W. PETERSON.